(12) United States Patent
Maskatia et al.

(10) Patent No.: US 7,166,989 B2
(45) Date of Patent: Jan. 23, 2007

(54) POWER SUPPLY SYSTEM FOR SUPPLYING POWER TO AN ELECTRONIC APPARATUS

(75) Inventors: Arif Maskatia, Milpitas, CA (US); Phil Mummah, Redwood City, CA (US); Mark Handa, Danville, CA (US)

(73) Assignee: Acer Incorporated, Taipei Hsien (TW)

( * ) Notice: Subject to any disclaimer, the term of this patent is extended or adjusted under 35 U.S.C. 154(b) by 321 days.

(21) Appl. No.: 10/788,283

(22) Filed: Mar. 1, 2004

(65) Prior Publication Data

US 2005/0189819 A1    Sep. 1, 2005

(51) Int. Cl.
  *H02J 7/00* (2006.01)
(52) U.S. Cl. ..................................... 320/128
(58) Field of Classification Search ............... 320/128, 320/132, 135, 106; 713/300, 321; 702/63
  See application file for complete search history.

(56) References Cited

U.S. PATENT DOCUMENTS

| | | | | |
|---|---|---|---|---|
| 5,565,759 A | * | 10/1996 | Dunstan | 320/135 |
| 5,691,742 A | * | 11/1997 | O'Connor et al. | 715/835 |
| 5,714,870 A | * | 2/1998 | Dunstan | 713/321 |
| 5,903,764 A | * | 5/1999 | Shyr et al. | 713/300 |
| 5,955,869 A | * | 9/1999 | Rathmann | 320/132 |
| 6,025,695 A | * | 2/2000 | Friel et al. | 320/106 |
| 6,031,354 A | * | 2/2000 | Wiley et al. | 320/116 |
| 6,074,775 A | * | 6/2000 | Gartstein et al. | 429/53 |
| 6,825,639 B1 | * | 11/2004 | Tashiro et al. | 320/132 |
| 6,842,708 B1 | * | 1/2005 | Odaohhara | 702/63 |

OTHER PUBLICATIONS

Smart Battery Data Specification @http://www.sbs-forum.org/specs/sbdat110.pdf, Revision 1.1, Dec. 1998, pp. 1-49.*

* cited by examiner

*Primary Examiner*—Pia Tibbits
(74) *Attorney, Agent, or Firm*—Pillsbury Winthrop Shaw Pittman LLP

(57) ABSTRACT

A power supply system for supplying power to a load of an electronic apparatus includes first and second battery units, and a selector coupled to the load and the first and second battery units. The selector is operable so as to break electrical connection between the second battery unit and the load and to simultaneously make electrical connection between the first battery unit and the load when a remaining capacity of the first battery unit is higher than a predetermined reference value, and so as to break electrical connection between the first battery unit and the load and to simultaneously make electrical connection between the second battery unit and the load when the remaining capacity of the first battery unit is lower than the predetermined reference value. A controller coupled to the selector, is responsive to a first control command, which may be issued by the electronic apparatus, so that the controller overrides the detector and enables operation of the selector in the first state.

7 Claims, 2 Drawing Sheets

POWER SUPPLY SYSTEM FOR SUPPLYING POWER TO AN ELECTRONIC APPARATUS

BACKGROUND OF THE INVENTION

1. Field of the Invention

The invention relates to a power supply system for supplying power to an electronic apparatus, more particularly to a power supply system that can ensure efficient utilization of battery resources of an electronic apparatus.

2. Description of the Related Art

A conventional power supply system for supplying power to a load of a notebook computer includes a rechargeable battery unit, a switch unit coupled to the rechargeable battery unit and the load, and a detector coupled to the rechargeable battery unit and the switch unit. The load generally requires a minimum operating voltage of 3.0 Volts. The rechargeable battery unit, when fully charged, generally has a maximum voltage output of 4.2 Volts. The detector detects a remaining capacity of the rechargeable battery unit, and compares the remaining capacity of the rechargeable battery unit with a predetermined reference value. The remaining capacity of the rechargeable battery unit is derived from a detected voltage output of the rechargeable battery unit. The predetermined reference value, which is the function of a minimum operating voltage required by the load, is typically set at 3.4 Volts. When the remaining capacity of the rechargeable battery unit is higher than the predetermined reference value, the detector enables the switch unit so as to maintain electrical connection between the rechargeable battery unit and the load such that the rechargeable battery unit supplies the power to the load. On the other hand, when the remaining capacity of the rechargeable battery unit is lower than the predetermined reference value, a corresponding warning message is provided. A predetermined time period after the warning message is provided, the detector enables the switch unit so as to break electrical connection between the rechargeable battery unit and the load such that the power supplied by the rechargeable battery unit to the load is suppressed.

The aforesaid conventional power supply system is disadvantageous in that the predetermined reference value is set to a voltage that is typically 10–15% higher than the minimum operating voltage of the load. Therefore, the power supplied to the load is suppressed way ahead of time as a precautionary measure. However, the remaining capacity of the rechargeable battery is under-utilized.

SUMMARY OF THE INVENTION

Therefore, the object of the present invention is to provide a power supply system that can ensure efficient utilization of battery resources of an electronic apparatus.

According to the present invention, a power supply system for supplying power to a load of an electronic apparatus includes first and second battery units, a selector, and a detector. The selector is adapted to be coupled to the load, and is coupled to the first and second battery units. The selector is operable in a first state, where the selector breaks electrical connection between the second battery unit and the load and simultaneously makes electrical connection between the first battery unit and the load such that the first battery unit supplies the power to the load, and a second state, where the selector breaks electrical connection between the first battery unit and the load and simultaneously makes electrical connection between the second battery unit and the load such that the second battery unit supplies the power to the load. The detector is coupled to the selector and the first battery unit, and is operable so as to detect a remaining capacity of the first battery unit and so as to compare the remaining capacity of the first battery unit with a predetermined reference value. The detector enables operation of the selector in the first state when the remaining capacity of the first battery unit is higher than the predetermined reference value, and in the second state when the remaining capacity of the first battery unit is lower than the predetermined reference value.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
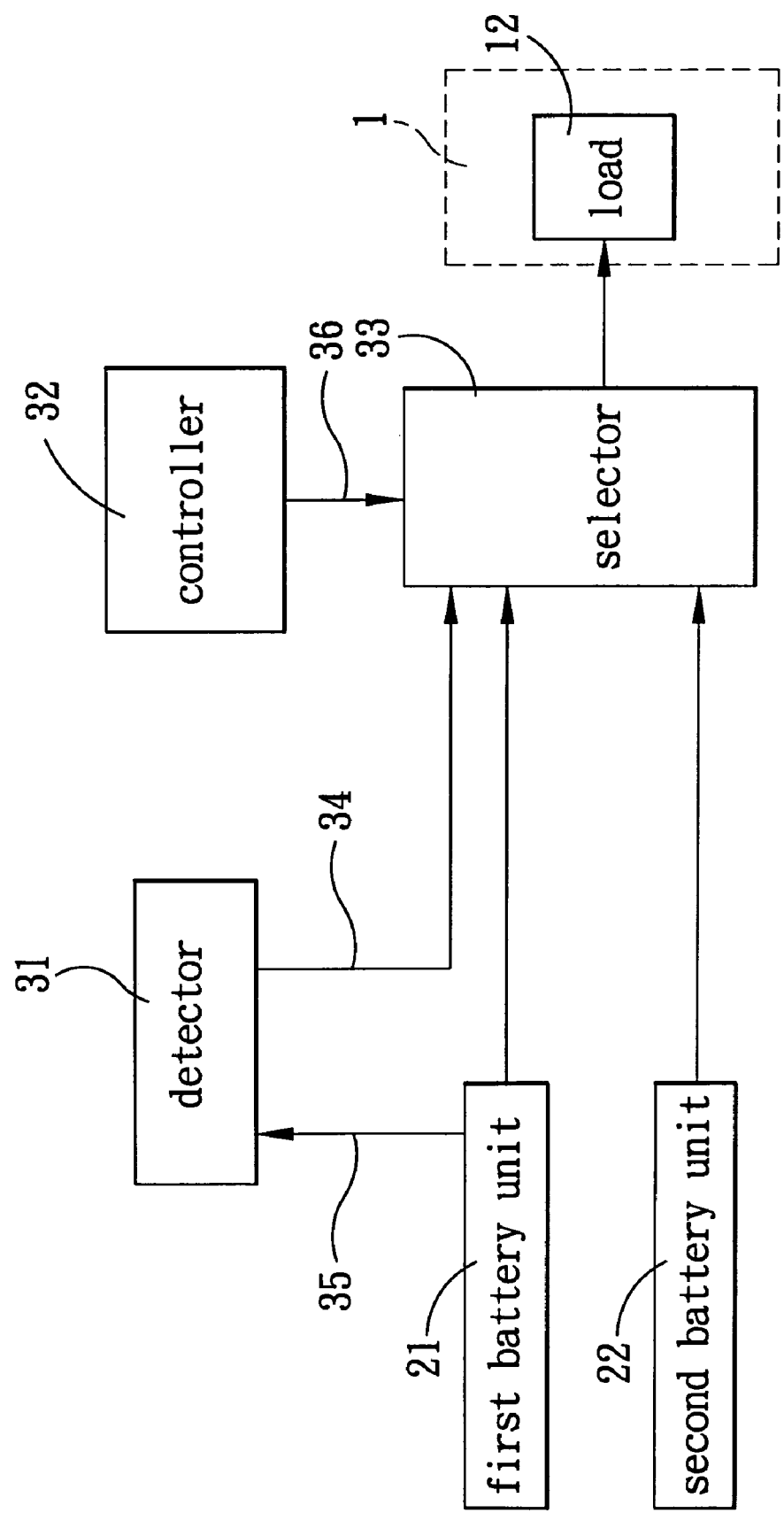
FIG. 1 is a schematic circuit block diagram of the preferred embodiment of a power supply system for supplying power to an electronic apparatus according to the present invention.

Referring to FIG. 1, the preferred embodiment of a power supply system for supplying power to a load 12 of an electronic apparatus 1 according this invention is shown to include first and second battery units 21, 22, a selector 33, and a detector 31.

The electronic apparatus 1 is embodied in a notebook computer that includes the load 12.

Figure 2:
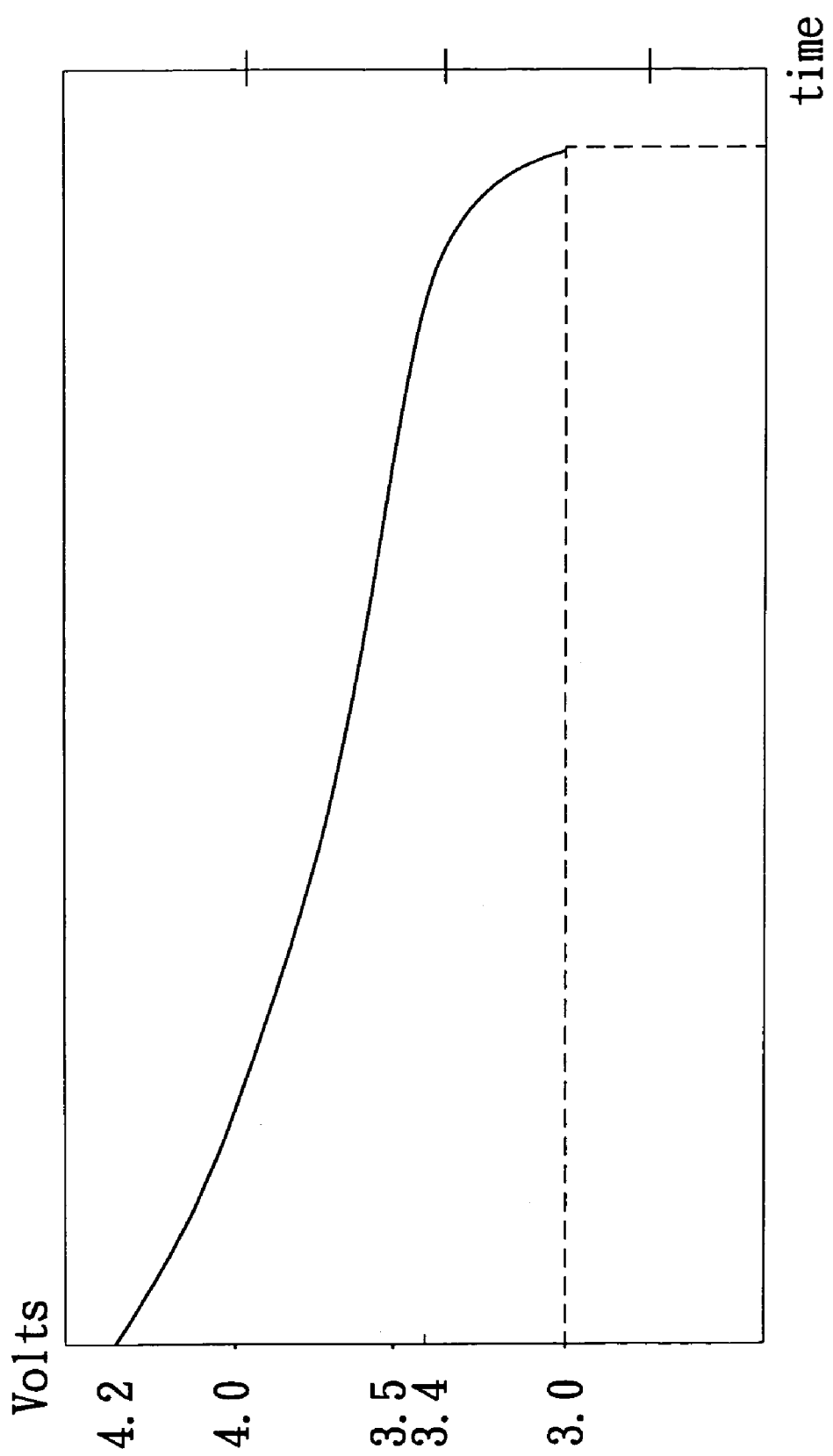
FIG. 2 is a plot to illustrate how a voltage output of a battery unit varies with operating time of the electronic apparatus.

It is noted that the first and second battery units 21, 22 are rechargeable. Moreover, the second battery unit 22 has a total power supplying capacity that is less than that of the first battery unit 21. Hence, the first battery unit 21 serves as a main power source, whereas the second battery unit 22 serves as a reserve power source. Further, as illustrated in FIG. 2, the maximum voltage output of the first battery unit 21 when the latter is fully charged is 4.2 Volts.

The selector 33 is adapted to be coupled to the load 12, and is coupled to the first and second battery units 21, 22. In this embodiment, the selector 33 is operable in a first state, where the selector 33 breaks electrical connection between the second battery unit 22 and the load 12 and simultaneously makes electrical connection between the first battery unit 21 and the load 12 such that the first battery unit 21 supplies the power to the load 12, and a second state, where the selector 33 breaks electrical connection between the first battery unit 21 and the load 12 and simultaneously makes electrical connection between the second battery unit 22 and the load 12 such that the second battery unit 22 supplies the power to the load 12.

The detector 31 is coupled to the selector 33 and the first battery unit 21. In this embodiment, the detector 31 is operable so as to detect a remaining capacity of the first battery unit 21, and so as to compare the remaining capacity of the first battery unit 21 with a predetermined reference value. The remaining capacity of the first battery unit 21 is derived from a detected voltage output of the first battery unit 21, in a known manner. The predetermined reference value is a function of a minimum operating voltage required by the load 12. As illustrated in FIG. 2, the minimum operating voltage required by the load 12 is 3.0 Volts, and the predetermined reference value is set to 3.0 Volts. It is noted that the detector 31 is coupled to the selector 33 through a first system management bus 34. Furthermore, the detector 31 is coupled to the first battery unit 21 through a second system management bus 35. The second system management bus 35 permits transmission of the remaining capacity of the first battery unit 21 to the detector 31.

The power supply system further includes a controller 32 coupled to the selector 33. It is noted that the controller 32 is coupled to the selector 33 through a third system management bus 36.

In operation, the detector 31 detects the remaining capacity of the first battery unit 21, and compares the remaining capacity of the first battery unit 21 with the predetermined reference value. When the remaining capacity of the first battery unit 21 is lower than the predetermined reference value, the detector 31 enables operation of the selector 33 in the second state. At this time, when the electronic apparatus 1 is connected to a commercial alternating current (AC) power source (not shown) through a power adapter (not shown), the AC power source supplies the power to the load 12 and, at the same time, charges the first and second battery units 21, 22, in a manner well known in the art. At an instant the electronic apparatus 1 is disconnected from the AC power source, the detector 31 detects the remaining capacity of the first battery unit 21. When the remaining capacity of the first battery unit 21 is still lower than the predetermined reference value, the detector 31 maintains operation of the selector 33 in the second state. On the other hand, when the remaining capacity of the first battery unit 21 is higher than the predetermined reference value, the detector 31 enables operation of the selector 33 in the first state.

During operation, the controller 32 is responsive to a first control command, which may be issued by the electronic apparatus 1, so that the controller 32 overrides the detector 31 and enables operation of the selector 33 in the first state. Thereafter, the selector 33 is maintained in the first state for a first predetermined time period. Once the predetermined time period has elapsed, the detector 31 detects the remaining capacity of the first battery unit 21, and compares the remaining capacity of the first battery unit 21 with the predetermined reference value. The detector 31 maintains the selector 33 in the first state or enables operation of the selector 33 in the second state depending on whether the remaining capacity of the first battery unit 21 is higher or lower than the predetermined reference value. Furthermore, the controller 33 is responsive to a second control command, which may be issued by the electronic apparatus 1, so that the controller 33 overrides the detector 31 and enables operation of the selector 33 in the second state. Thereafter, the selector 33 is maintained in the second state for a second predetermined time period. Once the second predetermined time period has elapsed, the detector 31 detects the remaining capacity of the first battery unit 21 and compares the remaining capacity of the first battery unit with the predetermined reference value. Likewise, the detector 31 maintains the selector 33 in the second state or enables operation of the selector 33 in the first state depending on whether the remaining capacity of the first battery unit 21 is lower or higher than the predetermined reference value.

It has thus been shown that the power supply system for supplying power to a load 12 of an electronic apparatus 1 of this invention includes first and second battery units 21, 22, a selector 33 coupled to the first and second battery units 21, 22, and a detector 31 coupled to the first battery unit 21 and the selector 33. The detector 31 detects a remaining capacity of the first battery unit 21, and compares the remaining capacity of the first battery unit 21 with a predetermined reference value. When the remaining capacity of the first battery unit 21 is lower than the predetermined reference value, the selector 31 breaks electrical connection between the first battery unit 21 and the load 12, and simultaneously makes electrical connection between the second battery unit 22 and the load 12 such that the second battery unit 22 supplies the power to the load 12. Therefore, the predetermined reference value can be set to 3.0 Volts, which is the minimum operating voltage required by the load 12. As such, the capacity of the first battery unit 21 is utilized to its full extent, thereby maximizing the power supplied by the first battery unit 21 to the load 12 of the electronic apparatus 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power supply system for supplying power to an electronic apparatus, the electronic apparatus including a load, said power supply system comprising:
    first and second battery units;
    a selector adapted to be coupled to the load, and coupled to said first and second battery units, said selector being operable in a first state, where said selector breaks electrical connection between said second battery unit and the load and simultaneously makes electrical connection between said first battery unit and the load such that said first battery unit supplies the power to the load, and a second state, where said selector breaks electrical connection between said first battery unit and the load and simultaneously makes electrical connection between said second battery unit and the load such that said second battery unit supplies the power to the load;
    a detector coupled to said selector and said first battery unit, and operable so as to detect a remaining capacity of said first battery unit and so as to compare the remaining capacity of said first battery unit with a predetermined reference value; and
    a controller coupled to said selector, and responsive to a first control command such that said controller overrides said detector and enables operation of said selector in the first state,
    said detector enabling operation of said selector in the first state when the remaining capacity of said first battery unit is higher than the predetermined reference value,
    said detector enabling operation of said selector in the second state when the remaining capacity of said first battery unit is lower than the predetermined reference value.

2. The power supply system as claimed in claim 1, wherein said controller is further responsive to a second control command such that said controller overrides said detector and enables operation of said selector in the second state.

3. The power supply system as claimed in claim 1, wherein said detector derives the remaining capacity of said first battery unit from a detected voltage output of said first battery unit.

4. The power supply system as claimed in claim 1, wherein the predetermined reference value is a function of a minimum operating voltage required by the load.

5. The power supply system as claimed in claim 1, wherein said second battery unit has a total power supplying capacity that is less than that of said first battery unit.

6. The power supply system as claimed in claim 1, wherein said detector is coupled to said selector through a system management bus.

7. The power supply system as claimed in claim 1, wherein said controller is coupled to said selector through a system management bus.

* * * * *